(12) United States Patent
Kolbe et al.

(10) Patent No.: US 9,479,435 B2
(45) Date of Patent: Oct. 25, 2016

(54) METHOD AND SYSTEM FOR SUPPORTING TRANSPORT OF DATA PACKETS IN A NETWORK

(71) Applicant: NEC EUROPE LTD., Heidelberg (DE)

(72) Inventors: Hans-Joerg Kolbe, Darmstadt (DE); Andreas Kunz, Heddesheim (DE); Thomas Dietz, Weingarten (DE); Surendran Palanimuthu, Nuremberg (DE)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 14/352,084

(22) PCT Filed: Nov. 8, 2012

(86) PCT No.: PCT/EP2012/072196
§ 371 (c)(1),
(2) Date: Apr. 16, 2014

(87) PCT Pub. No.: WO2013/068505
PCT Pub. Date: May 16, 2013

(65) Prior Publication Data
US 2014/0247830 A1    Sep. 4, 2014

(30) Foreign Application Priority Data
Nov. 9, 2011   (EP) .................................... 11188441

(51) Int. Cl.
*H04L 12/46*    (2006.01)
*H04L 12/741*   (2013.01)
(Continued)

(52) U.S. Cl.
CPC ........... *H04L 45/74* (2013.01); *H04L 12/4633* (2013.01); *H04L 45/04* (2013.01); *H04L 49/354* (2013.01); *H04L 69/22* (2013.01)

(58) Field of Classification Search
CPC ....... H04L 45/74; H04L 69/22; H04L 45/04; H04L 12/4633; H04L 49/354; H04L 12/46; H04L 49/35
USPC ......................................................... 370/392
See application file for complete search history.

(56) References Cited

U.S. PATENT DOCUMENTS

| 6,292,839 B1 * | 9/2001 | Naudus | H04L 12/4633 709/236 |
| 6,708,219 B1 * | 3/2004 | Borella | H04L 12/4633 709/230 |

(Continued)

FOREIGN PATENT DOCUMENTS

WO    03/085900    10/2003

OTHER PUBLICATIONS

McKeown et al., "OpenFlow: Enabling Innovation in Campus Networks", Mar. 14, 2008.

(Continued)

*Primary Examiner* — Xavier S. Wong
(74) *Attorney, Agent, or Firm* — Young & Thompson

(57) ABSTRACT

A method for supporting transport of data packets in a network, wherein the data packets are transmitted from a source node to a destination node by employing a tunnel from a first tunnel endpoint to a second tunnel endpoint, wherein a tunnel header is added to the data packets at the first tunnel endpoint, wherein the data packets are transmitted between the tunnel endpoints via a network domain that includes one or more intermediate nodes functioning as transport network, and wherein the intermediate nodes forward the data packets, is characterized in that the tunnel is provided in the form of a virtual tunnel by removing the tunnel header from the data packets where the data packets enter the network domain and adding back the tunnel header to the data packets where the data packets exit the network domain. A corresponding system for supporting transport of data packets is disclosed.

24 Claims, 7 Drawing Sheets

(51) Int. Cl.
*H04L 12/931* (2013.01)
*H04L 12/715* (2013.01)
*H04L 29/06* (2006.01)

(56) References Cited

U.S. PATENT DOCUMENTS

| | | | |
|---|---|---|---|
| 7,328,393 B2* | 2/2008 | Chawla | H04L 1/0041 |
| | | | 714/774 |
| 7,653,056 B1 | 1/2010 | Dianes et al. | |
| 7,864,708 B1 | 1/2011 | Bryant et al. | |
| 8,751,691 B1* | 6/2014 | Brandwine | H04L 61/2521 |
| | | | 709/238 |
| 2008/0069024 A1* | 3/2008 | Iino | H04L 12/4633 |
| | | | 370/313 |
| 2008/0123652 A1* | 5/2008 | Akyol | H04L 12/4633 |
| | | | 370/392 |
| 2011/0310899 A1* | 12/2011 | Alkhatib | H04L 29/12047 |
| | | | 370/392 |
| 2013/0054761 A1* | 2/2013 | Kempf | H04L 47/781 |
| | | | 709/220 |

OTHER PUBLICATIONS

Roebuck, Kevin, Deep Packet Inspection (DPI), High-impact Strategies—What You Need to Know: Definitions, Adoptions, Impact, Benefits, Maturity, Vendors, 2011.

International Search Report dated Feb. 22, 2013, corresponding to PCT/EP2012/072196.

* cited by examiner (State of the art)

METHOD AND SYSTEM FOR SUPPORTING TRANSPORT OF DATA PACKETS IN A NETWORK

The present invention relates to a method for supporting transport of data packets in a network, in particular service and/or user aware transport of data packets, wherein said data packets are transmitted from a source node to a destination node by employing a tunnel from a first tunnel endpoint to a second tunnel endpoint, wherein a tunnel header is added to said data packets at said first tunnel endpoint, wherein said data packets are transmitted between said tunnel endpoints via a network domain that includes one or more intermediate nodes functioning as transport network, and wherein said intermediate nodes forward said data packets.

Furthermore, the present invention relates to a system for supporting transport of data packets in a network comprising a first tunnel endpoint and a second tunnel endpoint being configured to provide a tunnel for transmitting data packets, wherein said first tunnel endpoint is configured to add a tunnel header to said data packets, and a network domain that includes one or more intermediate nodes being configured to forward said data packets.

BACKGROUND OF THE INVENTION

In recent years carrier networks use tunneling techniques to separate traffic from users or different services from each other in case the traffic is transported over access and aggregation networks. This prevents network nodes from shortcutting traffic, i.e. the network nodes are prevented to get a shorter way for the traffic. Furthermore, such tunneling techniques neither allow access to traffic on intermediate nodes nor to break out traffic at intermediate nodes between tunnel endpoints.

For example, devices being attached to a node A want to communicate with devices being attached to a node B. As depicted in FIG. 1, the tunnel will be set up between the nodes A and B functioning as tunnel endpoints. Then, any intermediate node between node A and node B will only be able to read the tunnel header that is added at the first tunnel endpoint being represented by node A. At the second tunnel endpoint being represented by node B, the tunnel header will be removed.

Thus, nodes in between are only able to be made aware of the service that is transported if any of this information is incorporated and/or copied into outer headers that these intermediate nodes are able to decode. Unless in case of using header fields with large value ranges, e.g. stacked VLANs or MPLS labels, this method is very limited and requires a mapping function at both ends.

Another alternative is a Deep Packet Inspection (DPI) function. A DPI function inside an intermediate node may also allow decoding the inner headers of a data packet. With state of the art technology, e.g. according to Kevin Roebuck, "*Deep Packet Inspection (Dpi): High-Impact Strategies—What You Need to Know: Definitions, Adoptions, Impact, Benefits, Maturity, Vendors*", 2011, an intermediate node has to detect a data packet with a DPI-like function and has to decapsulate the tunnel header in order to decode the whole data packet. The intermediate node has to add the appropriate tunnel header back again in order to insert a data packet into the tunnel.

With regard to the OpenFlow paradigm, as described for example in McKeown et al. "*OpenFlow: Enabling Innovation in Campus Networks*", ACM Computer Communication *Review*, Vol. 38, Issue 2, pp. 69-74, 2008, tunnels can be virtual in a sense that each network node gets configured with a mapping rule to identify any kind of data packet as being part of a tunnel.

Thus, as an example, such a tunnel may be characterized by the tunnel endpoint identifier (TEID), IP address and port number in case of a GTP (GPRS Tunneling Protocol) tunnel in a 3GPP ($3^{rd}$ Generation Partnership Project) mobile core network or by the PPP session ID in case of PPPoE (Point-to-Point Protocol over Ethernet). Though, sessions can be treated individually, but tunnel headers have to be removed and added at each network node. Hence, tunnel header overhead is still involved and results in wasting bandwidth in networks, in particular regarding redundant tunnel headers in long range DSL access loops or microwave mobile backhaul.

SUMMARY OF THE INVENTION

It is therefore an object of the present invention to improve and further develop a method and a system of the initially described type for supporting transport of data packets in a network in such a way that, by employing mechanisms that are readily to implement, an efficient and/or optimized transport of the data packets is achieved.

In accordance with the invention, the aforementioned object is accomplished by a method comprising the features of claim 1. According to this claim, such a method is characterized in that said tunnel is provided in the form of a virtual tunnel by removing said tunnel header from said data packets where said data packets enter said network domain and adding back said tunnel header to said data packets where said data packets exit said network domain.

Furthermore, the aforementioned object is accomplished by a system comprising the features of claim 26. According to this claim, such a system is characterized in that said network system is configured to provide said tunnel in the form of a virtual tunnel by removing said tunnel header from said data packets where said data packets enter said network domain and adding back said tunnel header to said data packets where said data packets exit said network domain.

According to the invention it has first been recognized that the usage of tunnel headers on a data path has to be reduced in order to enable a more efficient and optimized transport of data packets. Specifically, only the plain data packets without tunnel header are to be transmitted, but on condition that the tunnel is provided outwardly. Furthermore, it has been recognized that a data link transmitting data packets can be utilized in a more optimized way by providing the tunnel in the form of a virtual tunnel inside the network domain. This virtual tunnel is implemented by removing the tunnel header from the data packets where the data packets enter the network domain. Thus, the data packets can be routed inside the network domain via one or more intermediate nodes functioning as transport network, wherein the transport network is enabled to route the plain decapsulated traffic without tunnel headers and to process it. Subsequently, at the egress of the network domain, the tunnel header is added back to the data packets where the data packets exit the network domain. Consequently, the intermediate nodes in the data path are allowed to read data packets they could normally not do because they could only read the tunnel headers. Additionally, intermediate nodes may be able to break out traffic and/or insert traffic locally in between the tunnel endpoints.

It is to be noted that the term plain data packets is mentioned in the sense of data packets without the tunnel header and that the plain data packets can be read/decoded by the intermediate nodes. Plain data packets may have headers, e.g. an IP (Internet Protocol) header which may be used for forwarding and/or routing the plain data packets via the intermediate nodes to its destination. However, the tunnel header is removed from the data packets where the data packets enter the network domain.

According to a preferred embodiment the tunnel endpoints may include an access node, an eNodeB (Evolved Node B), a Serving GW (Serving Gateway), a PDN GW (Packet Data Network Gateway), a SGSN (Serving GPRS Support Node), a GGSN (Gateway GPRS Support Node) and/or a BRAS (Broadband Remote Access Server) that can also be referred to as a BNG (Broadband Network Gateway). Generally, an implementation according to the present invention may be utilizable for any current and/or future system architecture of carrier networks.

According to a further preferred embodiment the tunnel being employed may include a GTP (GPRS Tunneling Protocol) tunnel, a GTP-C tunnel, a GTP-U tunnel, a PPP (Point-to-Point Protocol) tunnel, a PPPoE (PPP over Ethernet) tunnel, a GRE (Generic Routing Encapsulation) tunnel and/or a tunnel related to mobile IP protocols such as PMIP (Proxy Mobile IPv6) or DSMIP (Dual Stack Mobile IP).

Furthermore, it may be provided that the intermediate nodes include switches, routers and/or other network nodes. Intermediate nodes may forward data packets in order to function as transport network. For example, the intermediate nodes may be OpenFlow switches or dedicated nodes built for this purpose.

According to a preferred embodiment the intermediate nodes of the network domain, specifically the transport network, may be controlled by a controller function. For example, the controller may be a centralized controller function.

Advantageously, it may be provided that a routing function for the virtual tunnel is implemented by the controller function.

In a preferred embodiment, it may be provided that the controller function installs and/or manages forwarding rules for the data packets in the intermediate nodes. Thus, plain decapsulated traffic, i.e. the data packets without redundant tunnel headers, can be routed and processed. In doing so, the remaining plain data packets may be routed differently based on its destination address. For example, controlled by the central network controller function the intermediate nodes may be configured to break out traffic or insert traffic locally between the tunnel endpoints.

Advantageously, the controller function may be implemented as an OpenFlow controller.

According to a preferred embodiment the removing of the tunnel header and/or the adding back of the tunnel header is performed by encapsulation/decapsulation functions. Thus, an encapsulation/decapsulation function is able to encapsulate and/or to decapsulate the data packets.

Advantageously, the encapsulation/decapsulation functions may represent the boundary of the network domain.

Advantageously, it may be provided that a first encapsulation/decapsulation function represents an entrance of the network domain and a second encapsulation/decapsulation function represents an egress of the network domain and vice versa. Thus, the first encapsulation/decapsulation function may be inserted between the first tunnel endpoint and the transport network and the second encapsulation/decapsulation function may be inserted between the transport network and the second tunnel endpoint. For example, the encapsulation/decapsulation function may be located at the tunnel endpoint. Furthermore, the encapsulation/decapsulation function may also be located at an intermediate node, preferably at the first intermediate node after the first tunnel endpoint.

According to a preferred embodiment the first encapsulation/decapsulation function may intercept one of the data packets—intercepted data packet—being sent from the first tunnel endpoint to the second tunnel endpoint, wherein the first encapsulation/decapsulation function sends the intercepted data packet to the controller function, and wherein the controller function analyzes the tunnel header of the intercepted data packet and calculates a data path for the data packets.

According to a preferred embodiment the controller function may instruct the first encapsulation/decapsulation function to remove the tunnel header from the data packets, wherein the controller function instructs the intermediate nodes to forward the data packets to the second encapsulated/decapsulated function by installing appropriate forwarding rules. Additionally, the controller function may instruct the second encapsulation/decapsulation function to add back the analyzed tunnel header to the data packets.

According to an advantageous embodiment the controller function may automatically assign a distinctive separation identifier to the data packets in order to provide and/or ensure distinctiveness/uniqueness of the data packets. Thus, e.g. in case of overlapping IP (Internet Protocol) addresses in the payload packets, i.e. in the decapsulated data packets without the tunnel header, a virtual tunnel is possible and the data packets can be forwarded and routed in the data path.

Advantageously, it may be provided that the identifier is included inside an existing header field of the data packets.

Advantageously, the identifier may be used by one or more of the intermediate nodes on the data path in order to locally perform the data packet forwarding decision. Thus, an intermediate node may decide on the basis of the identifier to which node a data packet is to be forwarded.

Additionally or alternatively, an additional header that includes the identifier, e.g. a VLAN header or a MPLS header, may be appended to the data packets. Thus, a header that does not prevent an intermediate node from being able to read the data packet may be added to the decapsulated data packets having no tunnel header.

For example, a state engine may be implemented inside the controller function that detect uniqueness of a flow based on existing granted flows and assigns additional headers or modified headers to the flow. MAC (Media Access Control) addresses could be re-written in order to separate flows using the same IP addresses but assigned to different VPNs (Virtual Private Networks) or overlay networks. This could also be done with VLANs. As a result, an automated network slice creation is provided.

Advantageously, the controller function may be connected with the encapsualation/decapsulation functions and/or the tunnel endpoints. Thus, a communication between these entities and the controller function is provided.

According to a specific embodiment a tunnel endpoint may signal the need of performing the virtual tunnel to the controller function.

According to a further preferred embodiment, it may be provided that one or more of the intermediate nodes signals the need of performing the virtual tunnel to the controller function.

According to a still further preferred embodiment the controller function may inform one or more or of the intermediate nodes about the type of traffic and/or subscriber concerning the data packets. Thus, the intermediate nodes are aware of the service and/or the user of the virtual tunnel. For example, the intermediate nodes may initiate and/or perform specific procedures adapted for the type of the data traffic.

Advantageously, it may be provided that one or more of the intermediate nodes route one or more of the data packets in a different direction than the predefined data path of the initial tunnel. Thus, the data packets may be forwarded from an intermediate node to a service host instead of being forwarded towards the second tunnel endpoint. Predefined data path means in this context the data path of the data packets between the first tunnel endpoint and the second tunnel endpoint. Consequently, it is allowed for local services to receive data packets without tunnel headers.

Furthermore, it may be provided that one or more of the intermediate nodes route one or more data packets being received from a different direction, e.g. from a service host, onto the data path towards said second tunnel endpoint. The different direction is not included in the predefined data path of the initial tunnel. Thus, it is allowed for local services to inject data packets into the tunnel without having to use tunnel headers.

Advantageously, the different direction may include a direction to/from a service host, wherein the service host is dynamically instructed by the controller function with rules in order to determine the type of traffic and/or subscriber concerning said virtual tunnel. This implies that the service host can determine the user and/or the service assigned to the virtual tunnel.

According to a preferred embodiment the service host may be enabled to derive the type of traffic and/or subscriber concerning the virtual tunnel implicitly from a received data packet by considering static preconfiguration.

BRIEF DESCRIPTION OF THE DRAWINGS

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing

DETAILED DESCRIPTION OF THE PREFERRED EMBODIMENTS

Figure 1:
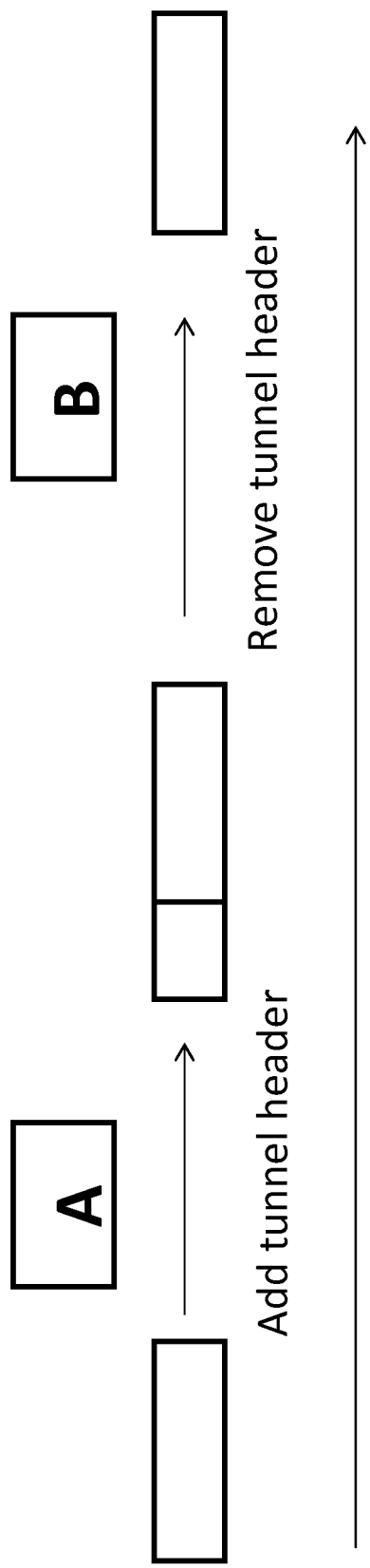
FIG. 1 illustrates an example of an application scenario of transporting data packets via a tunnel between two network nodes functioning as tunnel endpoints according to the state of the art.

FIG. 1 shows an example of an application scenario of transporting data packets via a tunnel between two network nodes functioning as tunnel endpoints according to the state of the art.

A device—e.g. a UE (User equipment)—that is being attached to a node A wants to communicate with a device being attached to a node B. As depicted in FIG. 1, the tunnel is set up between node A and node B. Node A and node B function as tunnel endpoints. Any intermediate node—not depicted in FIG. 1—between node A and node B is only be able to read the tunnel header that is added at the first tunnel endpoint being represented by node A. Subsequently, at the second tunnel endpoint being represented by node B the tunnel header is removed.

Thus, nodes in between are only able to be made aware of the service that is transported if any of this information is incorporated and/or copied into outer headers that these intermediate nodes are able to decode.

Figure 2:
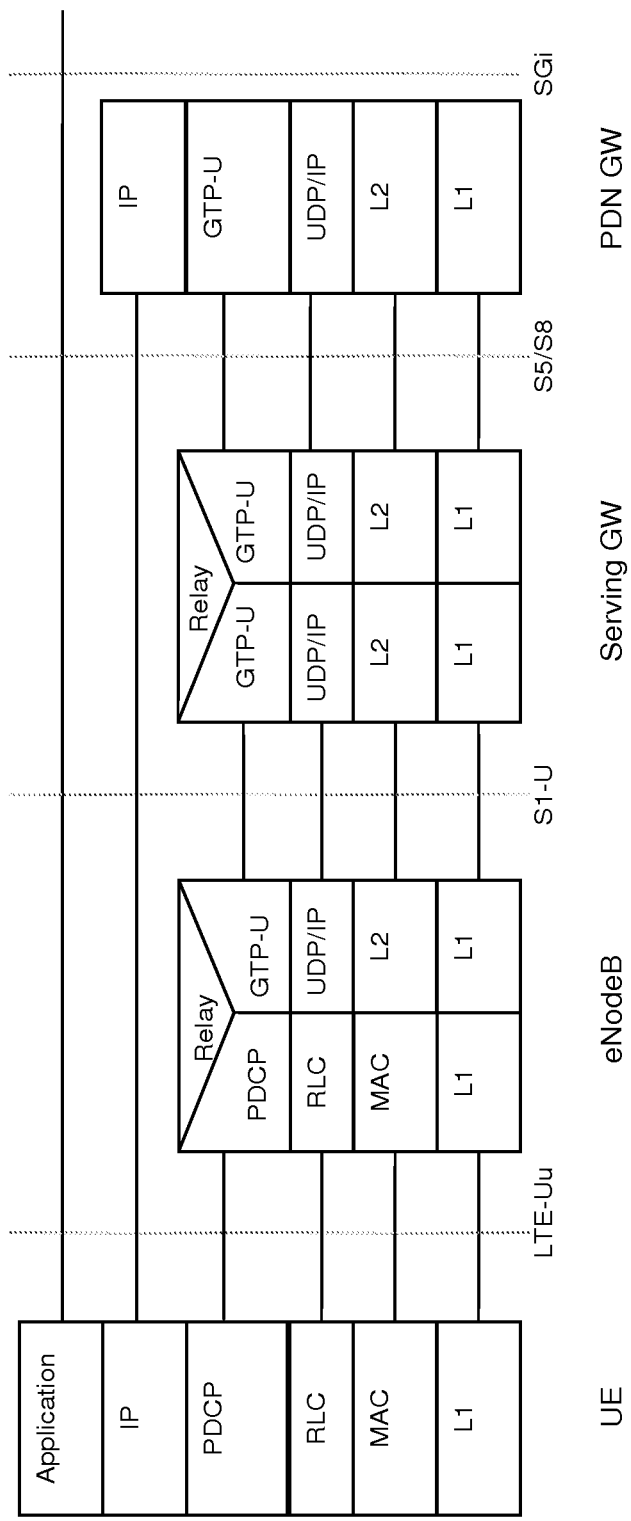
FIG. 2 is a diagram illustrating the protocol stack of the UE-PDN GW user plane with E-UTRAN.

FIG. 2 shows a diagram illustrating the protocol stack of the UE-PDN GW user plane with E-UTRAN. In a 3GPP mobile network the GTP protocol is used in the core network. An additional GTP header put on top of a VoIP (Voice over Internet Protocol) packet including 200 bytes at G.711@20 ms rate—G.711 is an ITU-T standard for audio companding—would add 20 bytes (IP)+8 bytes (UDP)+8 bytes (GTP)=36 bytes. Thus, the additional GTP header represents nearly 20% of the data packet.

The advantage of removing the tunnel headers according to an embodiment of the present invention can be clearly seen in the above mentioned example: since only the plain packets without tunnel header overhead need to be transmitted, the link can be utilized in a more optimized way and enables e.g. OpenFlow to provide an optimized routing of the packets. Of course the network nodes removing/adding back the headers have to correlate the packets with the right flows and need to store the correct headers for them.

Figure 3:
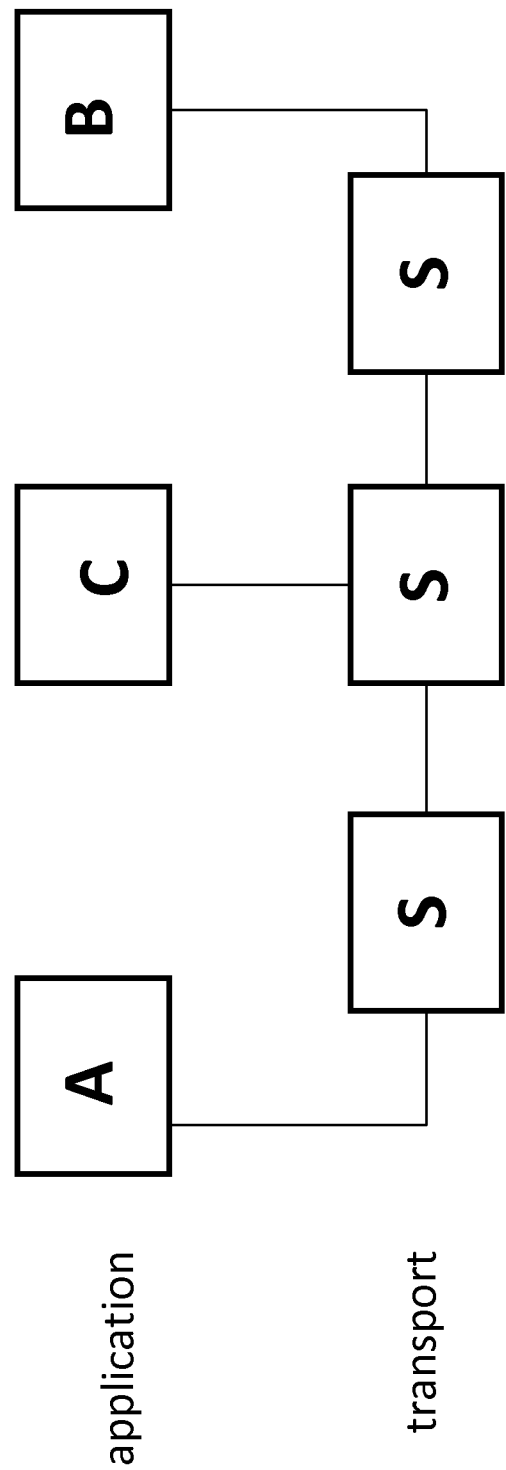
FIG. 3 is a schematic view illustrating an exemplary field of application according to the present invention.

FIG. 3 shows a schematic view illustrating an exemplary field of application according to the present invention. An embodiment of the present invention addresses the issues of allowing intermediate nodes in the data path to read packets they could normally not do because they could only read tunnel headers. Furthermore, it is addressed to allow intermediate nodes to break out traffic and/or to insert traffic locally, in between the tunnel endpoints.

According to FIG. 3 the procedure is described on a high level. A first system represented by node A sends data to a second system represented by node B by using a tunnel. The tunnels are differentiated by the tunnel headers (e.g. GTP-U, GTP-C or PPPoE headers). A third system represented by node C is connected to an intermediate node being a switch S and functioning as transport node. It may be desired to allow node C to insert traffic into the tunnel and/or to grab traffic out of the tunnel.

As depicted in FIG. 3 the nodes A, B and C may be regarded as nodes on application level, or at least above the transport level. The intermediate nodes of the transport plane, in the following designated as switches S, forward the data packets.

Figure 4:
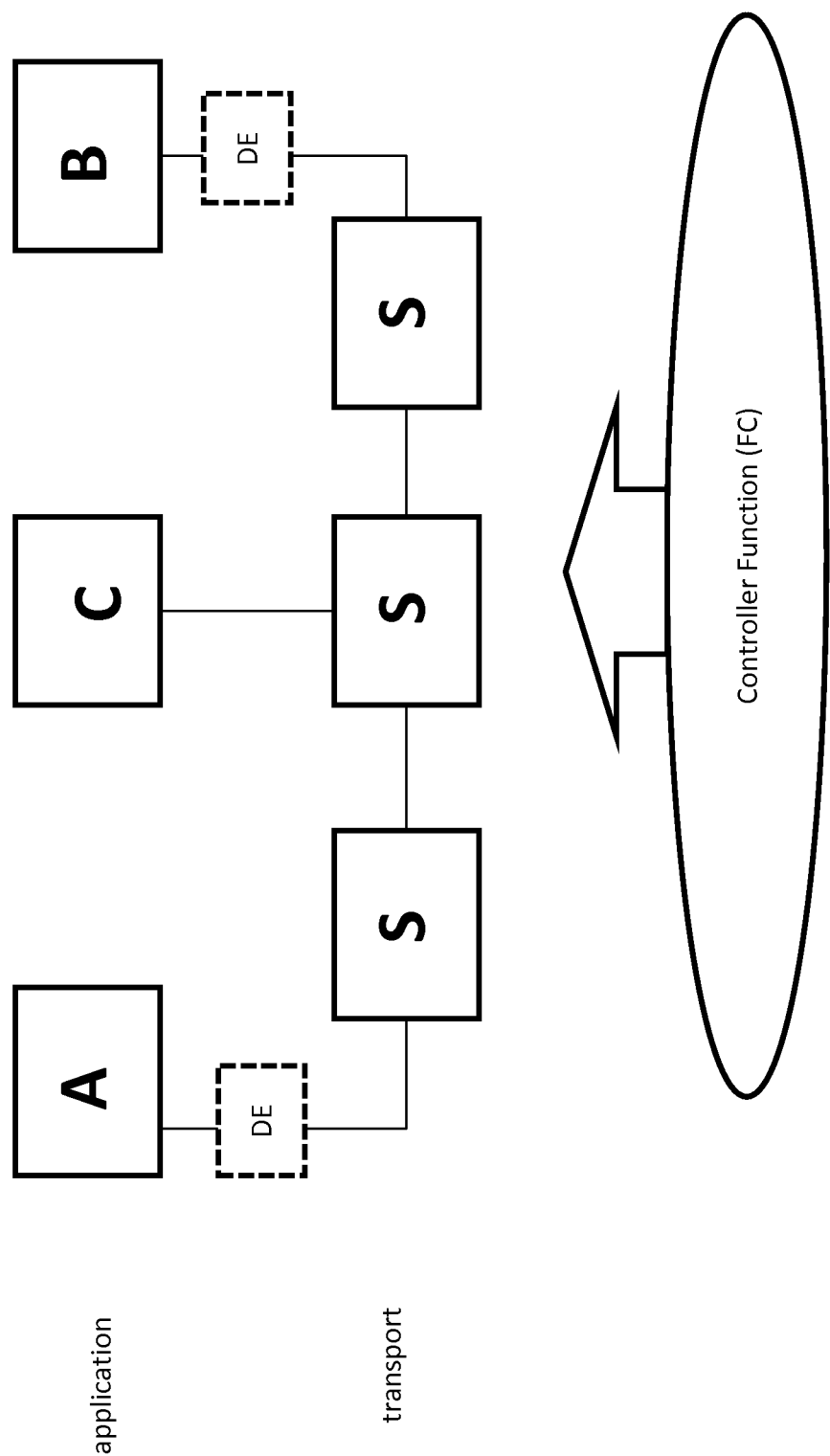
FIG. 4 is a schematic view illustrating an example of an application scenario of a method and a system according to an embodiment of the present invention.

FIG. 4 shows a schematic view illustrating an example of an application scenario of a method and a system according to an embodiment of the present invention. In contrast to the scenario of FIG. 3, the switches S illustrated in FIG. 4 are controlled by a centralized controller function FC. Furthermore, an encapsulation/decapsulation function DE is inserted between node A and the transport network and another encapsulation/decapsulation function DE is inserted between the transport network and node B. Thus, the first encapsulation/decapsulation function DE represents an entrance of a network domain and the second encapsulation/decapsulation function DE represents an egress of the network domain. However, where the encapsulation/decapsulation functions physically reside is not limited by the invention.

The controller function FC can install forwarding rules in the switches S and is able to connect either to the encapsulation/decapsulation functions DE or/and to the nodes A and B.

Thus, the nodes A and B create a tunnel as described, but the coordination between them, the encapsulation/decapsulation functions and the controller function, make them virtual tunnels inside the network domain/transport network.

According to the embodiment of FIG. 4, in case node A wants to set up a GTP tunnel to Node B a setting up of the GTP tunnel can be implemented as follows:

Node A sends a GTP packet with TEID (Tunnel Endpoint Identifier) towards node B;
DE at node A intercepts the GTP packet and sends the GTP packet to FC;
FC calculates data path and instructs DE at node A to remove the tunnel headers from all following packets;
FC instructs all switches to forward the payload packets, i.e. the plain data packets, to the DE of node B by installing appropriate rules;
FC instructs DE at node B to add the tunnel header it learned to the payload packets;
FC does the same for the other direction.

Optionally, the controller function FC may also instruct the node C about the characteristics and a possible inner packet to subscriber mapping, if required by the service.

Figure 5:
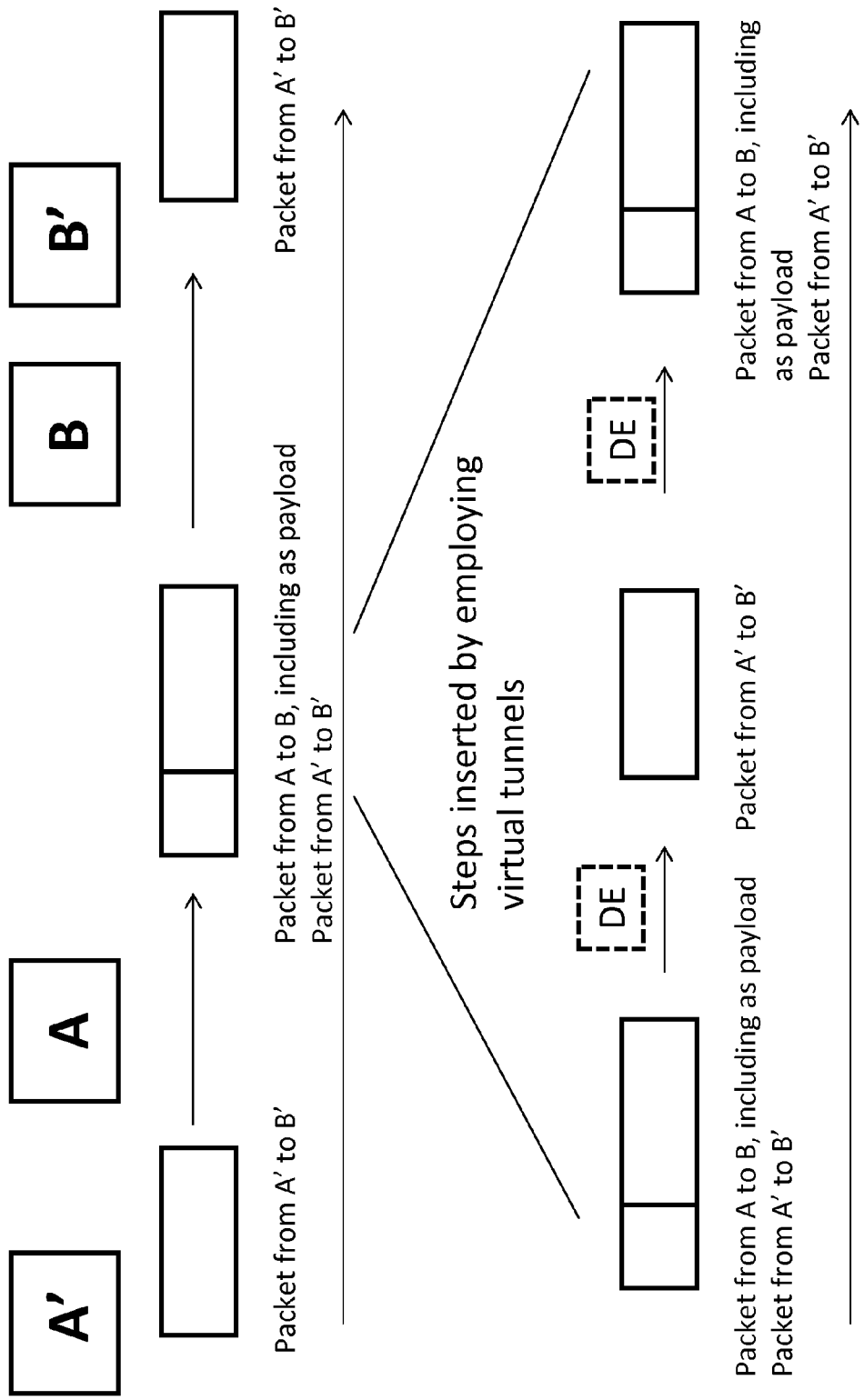
FIG. 5 is a schematic view illustrating another example of an application scenario of a method and a system according to an embodiment of the present invention.

FIG. 5 shows another example of an application scenario of a method and a system according to an embodiment of the present invention, As depicted in FIG. 5 data packets flow from a source node A' to a destination node B'. At node A functioning as first tunnel endpoint a GTP tunnel header is added to a data packet transmitted from source node A' to destination node B'. Node B functions as second tunnel endpoint. Thus, the data packet sent from tunnel endpoint A to tunnel endpoint B includes the packet from source node A' to destination node B' as payload.

In a legacy way, the data packets would get added the tunnel header which would then become removed at the tunnel endpoint. Intermediate nodes would have to go beyond this tunnel header to do anything with the payload of the data packets.

By employing virtual tunnels illustrated in FIG. 5 the following processing steps get added:
tunnel headers get removed at a first encapsulation/decapsulation function DE, and
tunnel headers get added again at a second encapsulation/decapsulation function DE.

In between, throughout the whole transport network, the tunnel headers are not used. Thus, any intermediate node can add traffic and/or receive traffic directly. The tunnel can be broken up. The routing function for the virtual tunnels is implemented by the controller function FC, e.g. an OpenFlow controller.

Figure 6:
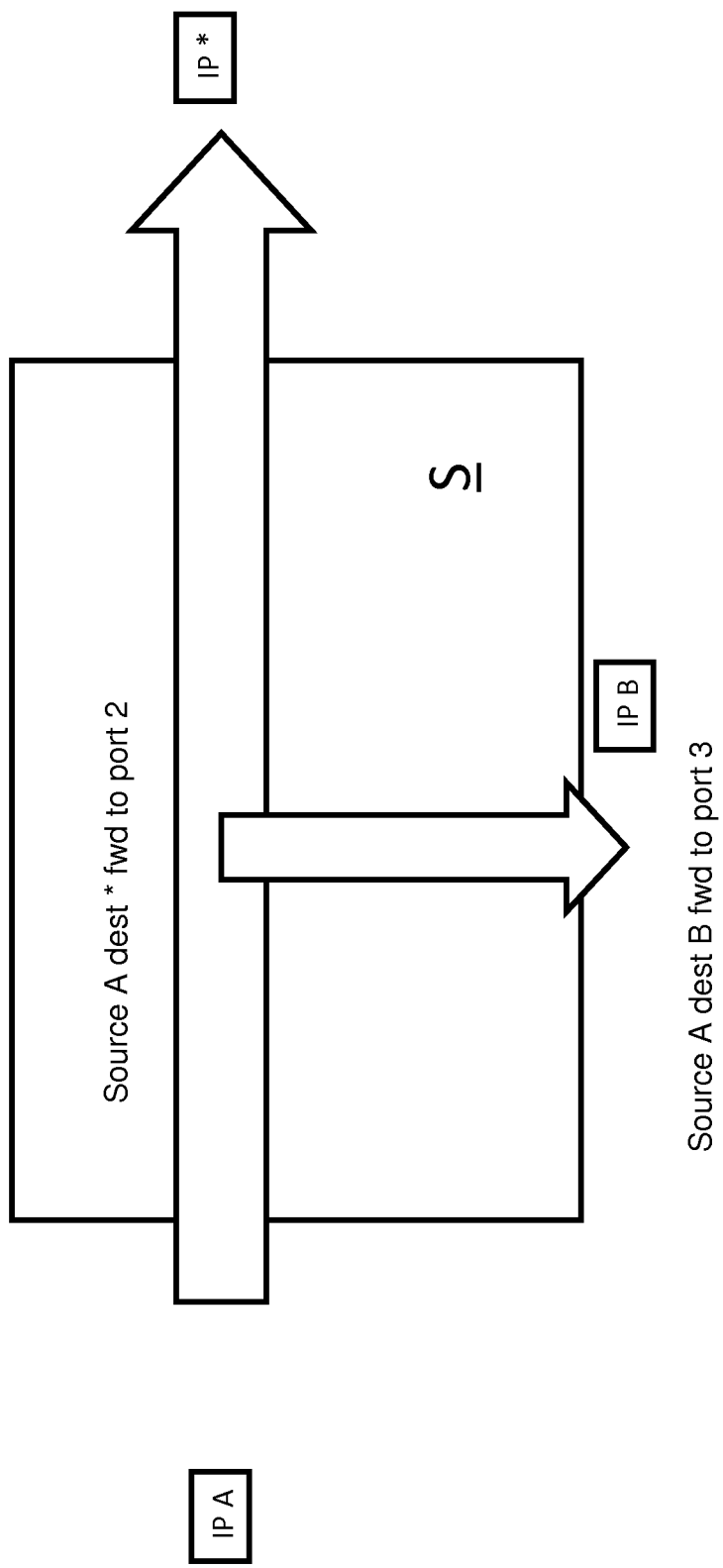
FIG. 6 is a schematic view illustrating another example of an application scenario of a method according to an embodiment of the present invention.

FIG. 6 shows another example of an application scenario of a method according to an embodiment of the present invention.

As depicted in FIG. 6, a switch S has a policy rule "forward traffic from IP A to port 2 towards the central hub/virtual tunnel endpoint". This policy rule may be overlaid with a rule "forward traffic from IP A to IP B to port 3 while forward the remaining traffic from IP A still to port 2 towards the central hub/virtual tunnel endpoint". This enables selective local user to user traffic. If applied based on local IP subnets, it could also be a more generic rule bridging all locally connected UEs. Thus, besides local traffic sources, user to user traffic is also highly enhanced.

Figure 7:
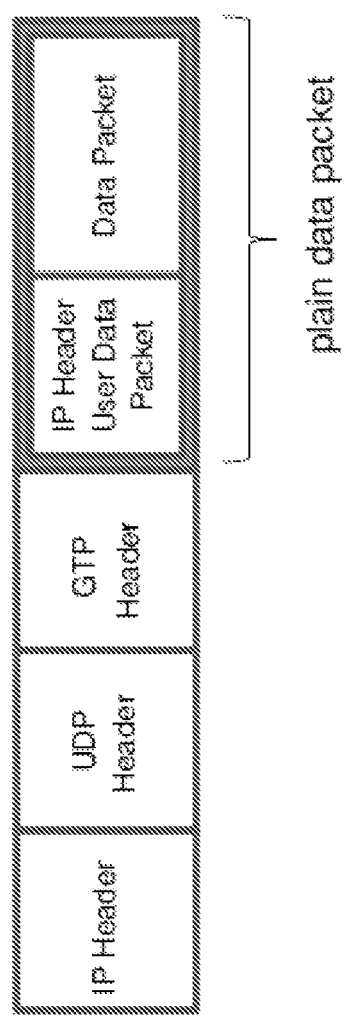
FIG. 7 is a schematic view illustrating a GTP (GTP Tunneling Protocol) data packet.

FIG. 7 is a schematic view illustrating a GTP (GTP Tunneling Protocol) data packet. The policy rule illustrated in FIG. 6 can be easily understood when looking at the GTP packet of FIG. 6.

Once the GTP+UDP+IP tunnel header got removed, only the plain data packet remains and based on its destination address, the packet may be routed differently.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting transport of data packets in a network, comprising:
   transmitting said data packets from a source node to a destination node by employing a tunnel from a first tunnel endpoint (A) to a second tunnel endpoint (B);
   adding a tunnel header to said data packets at said first tunnel endpoint (A); and
   transmitting said data packets between said tunnel endpoints via a network domain that includes one or more intermediate nodes functioning as transport network, and
   wherein said intermediate nodes forward said data packets,
   wherein said tunnel is provided in the form of a virtual tunnel by
   removing said tunnel header from said data packets where said data packets enter said network domain and
   adding back said tunnel header to said data packets where said data packets exit said network domain,
   wherein a first encapsulation/decapsulation function represents an entrance of said network domain,
   wherein a second encapsulation/decapsulation function represents an egress of said network domain,
   wherein a controller function (FC) instructs said first encapsulation/decapsulation function to remove the tunnel header from said data packets,
   wherein said controller function (FC) instructs said intermediate nodes to forward said data packets to said second encapsulated/decapsulated function by installing forwarding rules, and
   wherein said controller function (FC) instructs said second encapsulation/decapsulation function to add back the analyzed tunnel header to said data packets.

2. The method according to claim 1, wherein said tunnel endpoints include an access node, an eNodeB, a Serving Gateway (GW), a Packet Data Network Gateway (PDN GW), a Serving General Packet Radio Service (GPRS) Support Node (SGSN), a Gateway GPRS Support Node (GGSN), and/or a Broadband Remote Access Server or Broadband Network Gateway (BRAS/BNG).

3. The method according to claim 1, wherein said tunnel being employed includes a GPRS Tunneling Protocol (GTP) tunnel, a GTP-C tunnel, a GTP-U tunnel, a Point-to-Point Protocol (PPP) tunnel, a PPP over Ethernet (PPPoE) tunnel, a Generic Routing Encapsulation (GRE) tunnel and/or a tunnel related to a Proxy Mobile IPv6 (PMIP) tunnel or a Dual Stack Mobile IP (DSMIP) tunnel.

4. The method according to claim 1, wherein said intermediate nodes include switches (S), routers and/or Open-Flow-enabled nodes for forwarding said data packets.

5. The method according to claim 1, wherein said intermediate nodes are controlled by a centralized controller function.

6. The method according to claim 5, wherein a routing function for said virtual tunnel is implemented by said centralized controller function.

7. The method according to claim 5, wherein said centralized controller function installs and/or manages forwarding rules for said data packets in said intermediate nodes.

8. The method according to claim 5, wherein said centralized controller function is an OpenFlow controller.

9. The method according to claim 1, wherein the removing of said tunnel header and/or the adding back of said tunnel header is performed by encapsulation/decapsulation functions.

10. The method according to claim 9, wherein said encapsulation/decapsulation functions represent edges of said network domain.

11. The method according to claim 5, wherein said centralized controller function assigns a distinctive identifier to said data packets in order to ensure uniqueness of said data packets.

12. The method according to claim 11, wherein said identifier is included inside an existing header field of said data packets.

13. The method according to claim 11, wherein said identifier is employed by said intermediate nodes on the data path in order to locally perform the data packet forwarding decision.

14. The method according to claim 11, wherein an additional Virtual LAN (VLAN) header or a Multiprotocol Label Switching (MPLS) header, including said identifier is appended to said data packets.

15. The method according to claim 5, wherein said centralized controller function is connected with said encapsualation/decapsulation functions and/or said tunnel endpoints.

16. The method according to claim 5, wherein said centralized controller function informs one or more of said intermediate nodes about the type of traffic and/or subscriber concerning said data packets.

17. The method according to claim 1, wherein said first encapsulation/decapsulation function intercepts one of said data packets—intercepted data packet—being sent from said first tunnel endpoint (A) to said second tunnel endpoint (B), wherein said first encapsulation/decapsulation function sends said intercepted data packet to said controller function (FC), and wherein said controller function (FC) analyzes the tunnel header of said intercepted data packet and calculates a data path for said data packets.

18. The method according to claim 1, wherein one of said tunnel endpoints signals the need of performing said virtual tunnel to said controller function (FC).

19. The method according to claim 1, wherein one or more of said intermediate nodes signals the need of performing said virtual tunnel to said controller function (FC).

20. The method according to claim 1, wherein one or more of said intermediate nodes route one or more of said data packets in a different direction, in particular towards a service host, wherein said different direction is not included in the predefined data path of said tunnel towards said second tunnel endpoint (B).

21. The method according to claim 20, wherein said different direction includes a direction to/from a service host, wherein said service host is instructed by said controller function (FC) with a rule in order to determine the type of traffic and/or subscriber concerning said virtual tunnel.

22. The method according to claim 20, wherein said service host is enabled to derive the type of traffic and/or subscriber concerning said virtual tunnel implicitly from a received data packet by considering static preconfiguration.

23. The method according to claim 1, wherein one or more of said intermediate nodes route one or more data packets being received from a different direction, in particular from a service host, onto the data path towards said second tunnel endpoint (B), wherein said different direction is not included in the predefined data path of said tunnel.

24. A system for supporting transport of data packets in a network, comprising:
a first tunnel endpoint (A) and a second tunnel endpoint (B) being configured to provide a tunnel for transmitting data packets, said first tunnel endpoint (A) being configured to add a tunnel header to said data packets; and
a network domain that includes one or more intermediate nodes being configured to forward said data packets,
wherein said system is configured to provide said tunnel in the form of a virtual tunnel by
removing said tunnel header from said data packets where said data packets enter said network domain and
adding back said tunnel header to said data packets where said data packets exit said network domain,
wherein a first encapsulation/decapsulation function represents an entrance of said network domain,
wherein a second encapsulation/decapsulation function represents an egress of said network domain,
wherein a controller function (FC) is configured to instruct said first encapsulation/decapsulation function to remove the tunnel header from said data packets,
wherein said controller function (FC) is further configured to instruct said intermediate nodes to forward said data packets to said second encapsulated/decapsulated function by installing forwarding rules, and
wherein said controller function (FC) is further configured to instruct said second encapsulation/decapsulation function to add back the analyzed tunnel header to said data packets.

* * * * *